United States Patent
Cheung et al.

(10) Patent No.: US 8,948,787 B2
(45) Date of Patent: Feb. 3, 2015

(54) CONFIGURATION OF TELEPHONY SERVICES FOR PHONE BASED ON USER LOCATION

(75) Inventors: Eric Cheung, New York, NY (US); Karrie Hanson, Westfield, NJ (US)

(73) Assignee: AT&T Intellectual Property I, L.P., Atlanta, PA (US)

( * ) Notice: Subject to any disclaimer, the term of this patent is extended or adjusted under 35 U.S.C. 154(b) by 1096 days.

(21) Appl. No.: 12/343,206

(22) Filed: Dec. 23, 2008

(65) Prior Publication Data

US 2010/0159946 A1 Jun. 24, 2010

(51) Int. Cl.
| H04W 24/00 | (2009.01) |
| H04W 4/02 | (2009.01) |
| H04M 3/487 | (2006.01) |
| H04W 4/00 | (2009.01) |
| H04W 4/18 | (2009.01) |
| H04L 29/08 | (2006.01) |
| H04M 3/42 | (2006.01) |

(52) U.S. Cl.
CPC .............. *H04W 4/02* (2013.01); *H04M 3/4878* (2013.01); *H04W 4/001* (2013.01); *H04W 4/18* (2013.01); *H04L 67/20* (2013.01); *H04L 67/34* (2013.01); *H04L 67/18* (2013.01); *H04M 3/42102* (2013.01); *H04M 3/42348* (2013.01); *H04M 2203/651* (2013.01); *H04M 2207/18* (2013.01); *H04M 2242/14* (2013.01)
USPC ...................................... 455/456.3; 455/456.1

(58) Field of Classification Search
USPC ................ 455/456.1, 404.1, 441, 574, 456.2, 455/456.3, 404.2, 418, 419, 440
See application file for complete search history.

(56) References Cited

U.S. PATENT DOCUMENTS

| 5,802,157 | A   | * | 9/1998  | Clarke et al. ................... 379/196 |
| 5,842,112 | A   |   | 11/1998 | Fuller et al. |
| 6,545,589 | B1  | * | 4/2003  | Fuller et al. ................... 340/7.22 |
| 6,842,620 | B2  | * | 1/2005  | Smith et al. ................ 455/456.1 |
| 7,076,243 | B2  | * | 7/2006  | Parupudi et al. ............ 455/414.1 |
| 7,076,255 | B2  | * | 7/2006  | Parupudi et al. ........... 455/456.1 |
| 7,096,029 | B1  | * | 8/2006  | Parupudi et al. ........... 455/456.1 |
| 7,133,663 | B2  | * | 11/2006 | Fano et al. ................. 455/414.1 |
| 7,164,762 | B2  |   | 1/2007  | Hanson et al. |
| 7,213,048 | B1  | * | 5/2007  | Parupudi et al. .............. 709/203 |
| 7,221,939 | B2  | * | 5/2007  | Ylitalo et al. .............. 455/435.1 |
| 7,231,198 | B2  | * | 6/2007  | Loughran .................. 455/343.2 |
| 7,272,393 | B1  | * | 9/2007  | Wuthnow et al. .......... 455/432.1 |
| 7,289,813 | B2  | * | 10/2007 | Karaoguz .................. 455/456.1 |
| 7,302,465 | B2  | * | 11/2007 | Ayres et al. ................... 709/203 |
| 7,483,944 | B2  | * | 1/2009  | Parupudi et al. .............. 709/203 |
| 2001/0028709 | A1 | * | 10/2001 | Makela et al. ........... 379/214.01 |
| 2002/0080770 | A1 | * | 6/2002  | Hall et al. ...................... 370/352 |
| 2003/0032409 | A1 | * | 2/2003  | Hutcheson et al. ........... 455/414 |
| 2004/0214550 | A1 |   | 10/2004 | Jenkins |
| 2005/0069097 | A1 |   | 3/2005  | Hanson et al. |
| 2005/0069104 | A1 |   | 3/2005  | Hanson et al. |
| 2008/0057976 | A1 | * | 3/2008  | Rae et al. ................... 455/456.1 |

(Continued)

FOREIGN PATENT DOCUMENTS

EP          588101 A2 *  3/1994  ............. H04M 3/50

*Primary Examiner* — Magdi Elhag (74) *Attorney, Agent, or Firm* — Hartman & Citrin LLC (57) ABSTRACT

Telephony features for a phone are configured based on the location of a user of the phone. A system receives location data corresponding to a location of the phone. An operational mode is selected from stored operational modes based on the location data. The operational mode of the user phone is set to the selected mode. In one mode, a reply message is provided to the caller that is associated with the location of the phone.

23 Claims, 6 Drawing Sheets

(56) References Cited

U.S. PATENT DOCUMENTS

| | | | |
|---|---|---|---|
| 2008/0132214 A1* | 6/2008 | Dupray et al. | 455/415 |
| 2008/0248815 A1* | 10/2008 | Busch | 455/456.5 |
| 2008/0305806 A1* | 12/2008 | Jung et al. | 455/456.1 |
| 2008/0305808 A1* | 12/2008 | Chan et al. | 455/456.1 |
| 2008/0305813 A1* | 12/2008 | Rao | 455/466 |
| 2009/0054046 A1* | 2/2009 | Whittington et al. | 455/418 |
| 2009/0088138 A1* | 4/2009 | Jung et al. | 455/414.1 |
| 2010/0159946 A1* | 6/2010 | Cheung et al. | 455/456.1 |

* cited by examiner

CONFIGURATION OF TELEPHONY SERVICES FOR PHONE BASED ON USER LOCATION

FIELD

At least some embodiments disclosed herein relate to computer information systems in general, and more particularly but not limited to, configuration of telephony features for a phone based on the location of a user of the phone.

BACKGROUND

Existing telephony networks provide cell phone users with a variety of features. Users may configure these features using a web site provided by the network operator.

When attending or participating in activities such as watching a movie or concert, cell phone users often turn off their cell phone to avoid interruption of the event. Users typically do this voluntarily or when prompted by a message at the venue of the activity. When the cell phone is turned off, the user cannot be reached by a caller. In other situations, a user may set his or her phone to a vibration mode so it remains quiet during the activity, or a user may configure his or her phone so that only calls having a higher priority create an audible ringtone. However, users consistently desire that additional features be made available by their network providers and/or phone manufacturers for use with their phones.

BRIEF DESCRIPTION OF THE DRAWINGS

The embodiments are illustrated by way of example and not limitation in the figures of the accompanying drawings in which like references indicate similar elements.

DETAILED DESCRIPTION

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment, and such references mean at least one.

Reference in this specification to "one embodiment" or "an embodiment" or similar means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments, but not other embodiments.

DEFINITIONS

As used herein, a "phone" means any cellular phone, telephone, or other type of phone; or any computing device that provides voice communications for a user (e.g., a mobile, laptop, or palm computer running Voice-over-IP (VoIP) software); or any personal or other electronic device that provides voice communications for a user. Examples of phones include phones using VoIP.

A "user" of a phone is a person using a phone. A user of a phone includes, for example, a cellular or other phone system subscriber. A user, for example, receives calls from callers.

A "caller" is a person initiating a call to a user of a phone. A caller, for example, dials the user's phone number to initiate the call. A caller may be, for example, a subscriber to the same or a different network as that of the phone user.

Telephony Features Based on Location

In general, the various embodiments described herein relate to a method to configure the telephony features for a phone based on the location of a user of the phone. First, the location of the user is determined. Then, the telephony features are configured based on the location.

The method permits a user at a location participating in an event (e.g., a canoe trip) to enjoy telephony or phone features that are more desirable for the user while participating in that event. For example, a call to the user may receive a customized reply message indicating that the user is currently engaged in a specific activity related to the user's location.

Further, the telephony features may include aspects that are desirable to an operator of the event (e.g., the merchant that provides the canoe services). For example, the telephony features may include a message to a caller that contains an advertisement by the operator (e.g., an advertisement that promotes the canoe services to callers including discount offers).

The operation of the phone when the user is not present at certain locations may remain unchanged (e.g., remain in a default or normal operational mode). For example, if the phone is not at one of a list of predetermined locations, then the phone may simply complete a call to the user normally (e.g., by ringing through, or by going to a normal or default voice mail).

Determining User Location

The location of the user may be determined in many ways. For example, the phone may be configured or designed so that it can be swiped across a detection device (e.g., a magnetic strip), a GPS sensor may be used in the phone, the phone may detect a Wi-Fi or Bluetooth network associated with the location, or RFID may be used to determine the location. For example, after determining a GPS location, the user phone may send location data to the phone network.

Other examples of determining location include the user's calling a phone number advertised at the location, with the user's phone number being identified by caller ID during the call, and the location being associated with the phone number called. Similarly, the user may send an SMS message to a number advertised at the location. As additional examples, the user may interact with a web server at the location (e.g., to enter information that identifies the user's phone or to automatically communicate with the web server to detect the user's presence at the location). As an alternative example, the user may enter information into a web site on the Internet in advance of the user's actually arriving at a location (e.g., by specifying the time during which the user will be at the location). As another example, the user may swipe a credit or smart card at the location so as to identify the user.

Configuring Telephony Features

The telephony features may be configured in numerous ways to vary the manner in which the user phone will handle or respond to calls from callers. It should be noted that the telephony features may be configured in one of two general ways, as discussed further below. In a first way, the telephony features are configured in the telephony network itself. In the second way, the telephony features are configured on the user phone itself.

The types of telephony features that may be varied include incoming call handling (e.g., sending a reply message to a caller). For example, the features may be configured so that the user's phone operates in a do-not-disturb state, provides a reply message, and sends the caller to voicemail. The telephony features may optionally be varied for an event time period specified by the user when arriving at the location or a predetermined time period previously associated with the location.

As mentioned above, a call (from a caller) may receive a recorded message in reply that is customized for the location. For example, the message may be previously recorded by the user, or may be provided by an entity associated with the location (e.g., advertisement). As another example, the reply message may be rendered by text-to-speech technology.

Other examples of temporary, location-based settings may include, but are not limited to, temporary forwarding of the call to another number, temporary forwarding of the call to a voice mailbox to prevent the user's phone from ringing during the selected time period, and the use of a temporary, special message that may or may not have content related to the current location of the user (e.g., the content may not disclose the user's location due to the user's desire for privacy).

Implementation on Network

Figure 1:
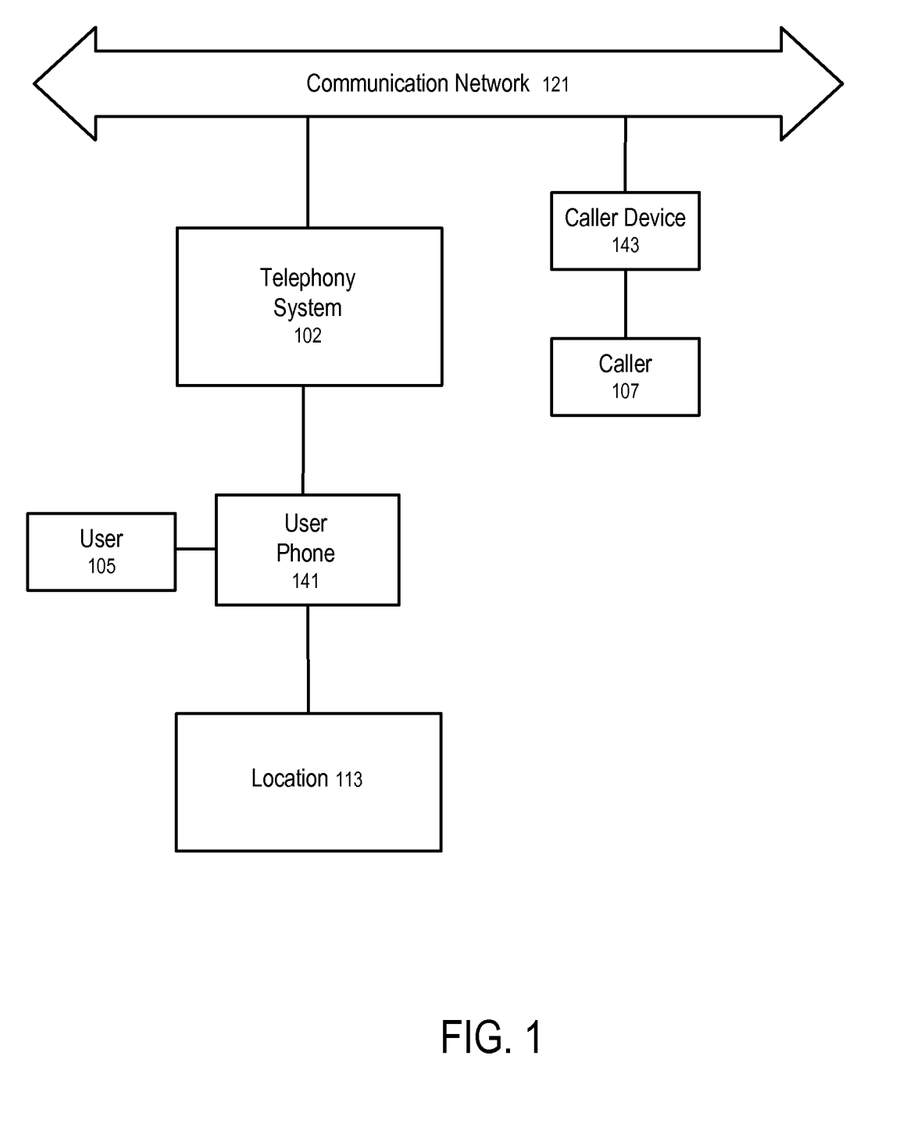
FIG. 1 shows a system to determine the location of a phone user and configure the telephony services associated with the phone based on the location according to a first embodiment.

FIG. 1 shows a system to determine the location of a phone user and configure the telephony services or features associated with the phone based on the location according to a first embodiment. A telephony system 102 provides network services to a user phone 141 operated by a user 105. A caller 107 uses a caller device 143 to call user phone 141 using communication network 121.

In this first embodiment, the telephony features configuration is executed on the network, rather than on the phone device. The location of user phone 141 may be determined by one or more approaches as was discussed above. For example, when phone 141 is determined to be at location 113, then the telephony services provided by telephony system 102 are changed or configured in a way to correspond to location 113 (as was discussed above, and as further discussed below). The user phone 141 need not be involved in the configuration by telephony system 102 if the user 105 or another source or device is providing the user location to telephony system 102.

Implementation on Phone

Figure 2:
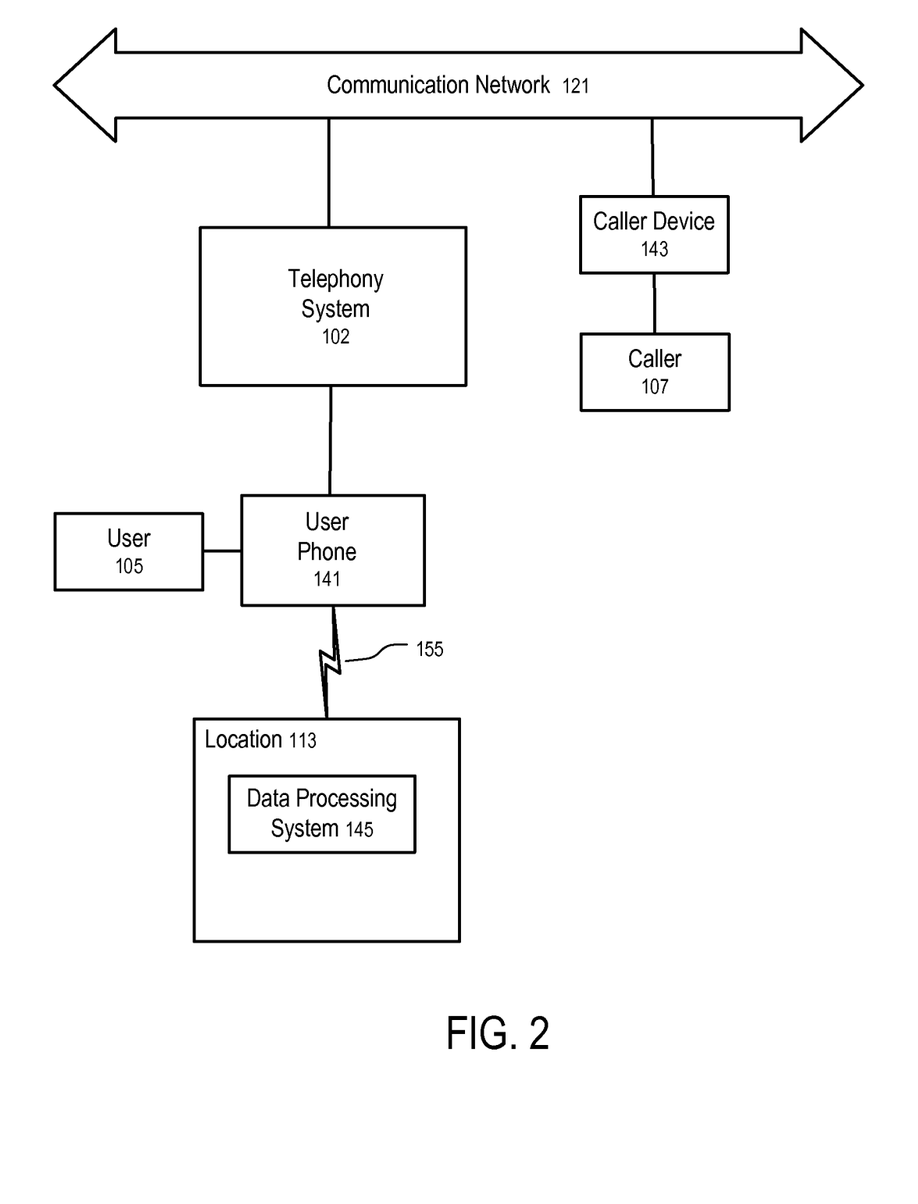
FIG. 2 shows a system to determine the location of a phone user and configure software executing on the phone based on the location according to second embodiment.

FIG. 2 shows a system to determine the location of a phone user and configure features of the phone, using software executing on the phone, based on the location according to a second embodiment. In this embodiment, the telephony features configuration is executed on the phone device itself. The telephony network does not need to be aware of the configuration that is being implemented on the phone (e.g., by software being executed on one or more processors on the phone).

In FIG. 2, telephony system 102 provides network services to user phone 141 operated by user 105. A caller 107 uses caller device 143 to call user phone 141 using communication network 121.

The location of user phone 141 again may be determined by one or more approaches as was discussed above. However, in this second embodiment, the location determination and information from this determination is received by phone 141, rather than telephony system 102. For example, a data processing system 145 (e.g., a local Wi-Fi server operating a Wi-Fi network) may be physically located at location 113. User phone 141 may detect (e.g., using Wi-Fi communications link 155) the presence of data processing system 145 (e.g., by detecting the Wi-Fi network and associating the network with location 113).

When phone 141 determines that it is physically at location 113, then phone 141 changes or configures its telephony features in a way that corresponds to location 113. For example, phone 141 may store a number of messages, each corresponding to a location. When phone 141 identifies location 113, then phone 141 may select and provide a reply message to a caller (via telephony system 102), wherein the reply message is customized to location 113 in one or possibly more than one way.

Additional Embodiments

Various other specific embodiments are now described in more detail. In another embodiment, a method, implemented in a data processing system (e.g., a telephony network system), for providing a message in reply to a call by a caller to a phone of a user includes: receiving location data corresponding to a location of the user; selecting a selected message from a plurality of messages based at least on the location data; and providing, in response to the call to the user, the selected message to the caller.

In another embodiment, a method, implemented by a phone of a user, for providing a message in reply to a call by a caller to the phone, includes: connecting with a data processing system at a location in the proximity of the user; receiving a message associated with the location; and providing, in response to the call to the user, the message to the caller.

In yet another embodiment, a method, implemented in a data processing system, for setting an operational mode of a phone of a user, includes: storing a plurality of operational modes for the phone; receiving location data corresponding to a location of the user; selecting a selected mode from the plurality of operational modes based at least on the location data; and setting the operational mode of the phone to the selected mode.

The disclosure includes methods and apparatuses which perform these methods, including data processing systems which perform these methods, and computer readable media containing instructions which when executed on data processing systems cause the systems to perform these methods. Other features will be apparent from the accompanying drawings and from the detailed description which follows.

In one embodiment, the telephony features for a user's phone can be configured so that the user is not disturbed during an event (e.g., concert or movie) occurring at a location. The configuration may be associated with or triggered by the location (e.g., by detection of the phone at the location), as discussed in more detail below. Instead of receiving a call from a caller, the caller may be provided with a message that is customized in some manner to correspond to the current location of the user (e.g., an identification or advertisement associated with a merchant operating at the location, or a message that describes the event in which the user is participating at the location), as discussed in more detail below. The user may be given the option as to whether a default message or the customized message is provided to the caller (e.g., depending on the identity of the caller, or privacy settings of the user). Various embodiments are discussed below.

Figure 3:
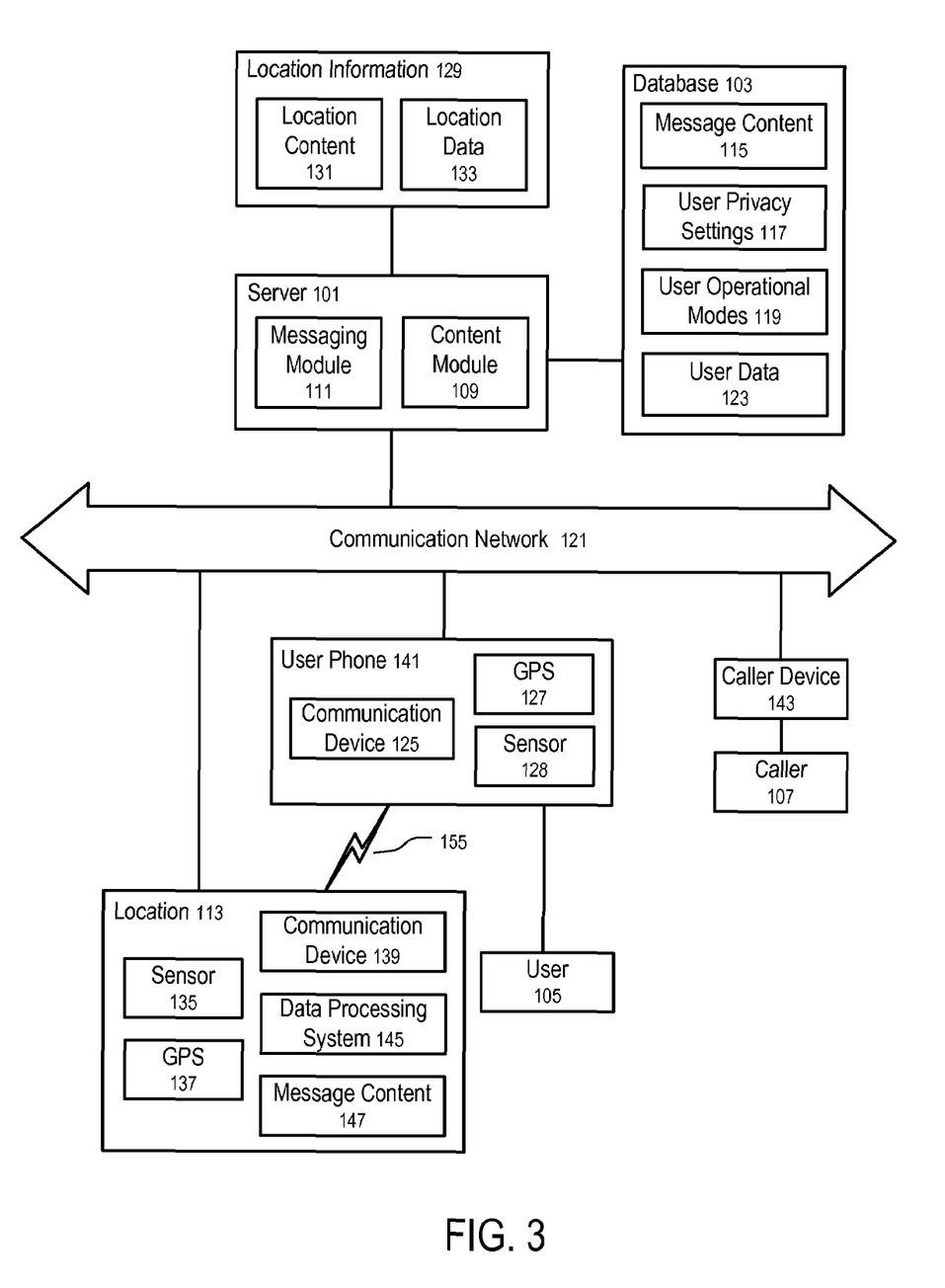
FIG. 3 shows a system to receive location data and configure an operational mode of a phone according to another more specific embodiment.

FIG. 3 shows a system to receive location data and configure an operational mode of a phone according to one embodiment. The system in FIG. 3 is only one specific, non-limiting, example of hardware components and systems that may be used with the general telephony services configuration methods described above.

In FIG. 3, user phone 141 of user 105 interacts with server 101 over a communication network 121 (e.g., the Internet, wireless network, cable or satellite television communications system, cellular communications system, etc.). For example, user phone 141 may be a cellular phone, communication network 121 may be operated by a cellular service provider, and server 101 may be operated by the same service provider. Telephony system 102 may be, for example, implemented using server 101.

Caller device 143 may be, for example, a cellular phone or other communication device that sends communications over communication network 121 in the form of a call to user phone 141 by caller 107.

Server 101 is connected to a database 103 (e.g., a distributed data storage facility) to receive and store various information from server 101. Examples include message content 115, user privacy settings 117, user operational modes 119, and other user data 123. Server 101 may receive user privacy settings 117, user operational modes 119, and/or other user data 123 from user phone 141, or otherwise from user 105 (e.g., via an end user website (not shown) controlled by the operator of network 121).

Message content 115 includes a number of messages from which a selected message is selected for providing in reply to caller 107. Message content 115 may be created by the operator of network 121, by a merchant operating at location 113, and/or by user 105. The providing of reply messages with advertisements (e.g., obtained from message content 115) to caller 107 and other callers may generate advertising revenue for the entity operating server 101 or network 121. The advertisement may be, for example, for a merchant having a physical business facility at location 113. User data 123 may be used in, or referenced during the creation of, reply messages. User data 123 may include, for example, a friend's list of user 105, and caller 107 being on the friend's list may be a condition for sending a certain type of reply message to caller 107.

Server 101 may include one or more web servers (or other types of data communication servers) to communicate with user phone 141 or caller device 143.

Server 101 receives location information 129, which includes location data 133 for identifying the physical location of user phone 141, and which may include location content 131. For example, user phone 141 may send GPS location data 133 to server 101 based on its location as determined by a GPS locating system 127 in user phone 141. Other approaches may be used to determine the location of user phone 141, which provide location data 133 to server 101. Location information 129 may be stored, for example, on server 101 or in database 103.

Server 101 includes a messaging module 111 and a content module 109. Messaging module 111 controls the handling of incoming calls from callers (e.g., caller 107) and the providing of reply messages to these calls using location information 129.

Content module 109 manages the storage and access of content to be provided in reply messages to callers to user phone 141 (e.g., caller 107). For example, content module 109 uses location data 133 to find message content 115 that corresponds to location 113.

In one embodiment, server 101 receives information that provides an identity of user phone 141. For example, this identity may be provided by caller device 143 when user phone 141 is called. Content module 109 may use this phone identity to reference the message content 115 applicable to user phone 141. Also, in other embodiments, selection of a reply message from message content 115 does not require referencing the identity of user phone 141, and location data 133 alone may be used to select the reply message.

User phone 141 may include a sensor 128 and a communication device 125. Sensor 128 may be, for example, an element of a proximity or other type of sensor (e.g., magnetic) used to determine when user phone 141 is physically present at location 113.

Location 113 may also include a data processing system 145, which may be, for example, a kiosk located for convenient physical access by user 105 when visiting location 113. For example, user 105 may physically pass user phone 141 near (e.g., within three feet or less) the kiosk in order for data processing system 145 to detect the physical presence of user phone 141 (e.g., by use of sensor 135).

Communication device 125 may be, for example, a Bluetooth transceiver used for wireless coupling over communications link 155 with a communication device 139 at location 113. User phone 141 and/or data processing system 145 may periodically broadcast a signal searching for a possible coupling with another device that may be actively operating in conformance with a system as described herein.

Location 113 may include a sensor 135 used for detecting the presence of phone 141. Sensor 135 may interact with sensor 128 of user phone 141. Other forms of detecting the physical presence of user phone 141 may include, for example, radio frequency identification (RFID) and user phone 141 detecting a signature for a wireless network at location 113.

Data processing system 145 may be coupled to a GPS locating system 137, which may, for example, send GPS location data 133 to server 101 when the presence of user phone 141 has been detected. In another embodiment, data processing system 145 may send predetermined GPS or other location data (e.g., predetermined GPS data for location 113 when it is a fixed geographic location).

In other embodiments, user 105 may enter data manually in order to provide location data 133.

In yet other embodiments, database 103 may store a plurality of phone numbers, each associated with a location. User 105 may call a phone number corresponding to location 113 (e.g., this phone number may be displayed or posted for users at location 113). Server 101 may determine the phone number called (e.g., from caller identification (ID) data), and then associate the called phone number with one of the stored phone numbers in order to identify location 113 from other locations. This identification provides location data 133 for use by content module 109 in selecting a message from message content 115 or selecting an operational mode from user operational modes 119.

Location 113 is typically a fixed geographic location. However, in alternative embodiments, location 113 may correspond to a location on a moving vehicle (e.g., cruise ship, airplane, or bus). User 105 may desire, for example, that the reply message to caller 107 be the same during the user's presence on a vehicle.

Data processing system 145 may also store message content 147, which may, for example, be created by a merchant or other entity at location 113 (e.g., the sponsor of a concert or operator of a cruise ship). System 145 may send message content 147 to server 101 for storage as location content 131 so that messaging module 111 may incorporate customized content from location 113 with message content 115 prior to providing a reply message to caller 107.

In one embodiment, message content 147 may include content created while the user is active at the location 113 (e.g., a video of user 105 performing an activity at location 113 such as rafting or riding a roller coaster). Data processing system 145 may send the content created at location 113 to server 101 for updating of location content 131 to be incorporated into reply messages.

In alternative embodiments, data processing system 145 may send message content 147 directly to caller device 143, or to another network system (not shown, but coupled to communication network 121 as an example) that will provide a reply message to caller device 143 that includes message content 147. In other embodiments, content module 109 may command the selection of the reply message from message content 147, and the reply message may be provided by data processing system 145 from location 113.

In an alternative embodiment, after data processing system 145 and user phone 141 have discovered one another, a reply message from message content 147 is sent from system 145 to user phone 141, with or without the use of communication network 121 (e.g., communications link 155 may be used). System 145 may select the message using an identity of user phone 141 (e.g., as determined by manual input of user 105 into data processing system 145 at location 113 or even remotely in advance of arrival at location 113). The reply message is then sent from user phone 141 to caller device 143 (e.g., over communication network 121).

In one embodiment, user phone 141 may submit multimedia content to server 101 that may be included in message content 115 (e.g., for incorporating user-customized items into reply messages to callers). For example, in one embodiment, user phone 141 includes a digital still picture camera, or a digital video camera.

User operational modes 119 or user privacy settings 117 may include various user preference criteria used to select the information to be presented to, or other actions taken for, user phone 141. For example, modes 119 or settings 117 may include a requirement that a caller 107 be listed in a preference list of user 105 prior to the caller receiving a customized reply message.

In one embodiment, the user operational modes 119 and/or user privacy settings 117 are configurable, pluggable, and tunable by user 105. For example, user 105 may select a set of operational modes or privacy settings from a set of pre-defined criteria, or add custom-designed criterion, or adjust the parameters of the selected criteria. Server 101 may provide customized reply messages to caller 107 subject to the user privacy settings 117. Also, the setting of user phone 141 to a user operational mode 119 may be subject to user privacy settings 117.

In one specific example of an operational mode for user phone 141, the reply message informs caller 107 that user 105 is participating in an activity at location 113 and further may include instructions for reaching the user 105 in an emergency (e.g., by providing a predetermined code, such as pressing a "1" or "2" button on the caller device 143). User phone 141 may be set to a vibrate-only mode while user 105 is at location 113.

Although FIG. 3 illustrates an exemplary system implemented in a phone network architecture, embodiments of the disclosure can be implemented in various alternative architectures.

In some embodiments, a combination of client-server architecture and peer to peer architecture can be used, in which one or more centralized servers (e.g., server 101) may be used to provide some of the information and/or services and the peer to peer network is used to provide other information and/or services. Thus, embodiments of the disclosure are not limited to a particular architecture.

Several additional, non-limiting examples of phones, and data processing systems for managing calls to phones and reply messages for callers to a phone of a user (e.g., a subscriber), are described in U.S. Pat. No. 7,164,762, issued Jan. 16, 2007 (titled "ENHANCED CALL FEATURE SERVICE"), U.S. Patent Publication No. 2005/0069097, published Mar. 31, 2005 (titled "ENHANCED CALL NOTIFICATION SERVICE"), and U.S. Patent Publication No. 2005/0069104, published Mar. 31, 2005 (titled "CALL MANAGEMENT SERVICE"), all of which are incorporated by reference in their entirety.

Also, non-limiting examples of systems for managing a telecommunications call in a telecommunications network from a caller to an end user are described in U.S. Pat. No. 6,545,589, issued Apr. 8, 2003 (titled "METHOD AND APPARATUS FOR MANAGING TELECOMMUNICATIONS") and U.S. Pat. No. 5,842,112, issued Nov. 24, 1998 (titled "PERSONAL COMMUNICATOR SYSTEM FOR IDENTIFYING A TELEPHONE WHICH IS DISPOSED PROXIMATE A LOCATOR TRANSMITTER"), all of which are incorporated by reference in their entirety.

In addition, non-limiting examples of systems for determining the location of a network activated mobile phone and for users to leave or access messages that become available due to the physical location of a wireless network subscriber's device are described in U.S. Patent Application No. 2004/0214550, published Oct. 28, 2004 (titled "SYSTEM AND METHOD OF ACCESSING AND RECORDING MESSAGES AT COORDINATE WAY POINTS"), which is incorporated by reference in its entirety.

Data Processing System Embodiments

Figure 4:
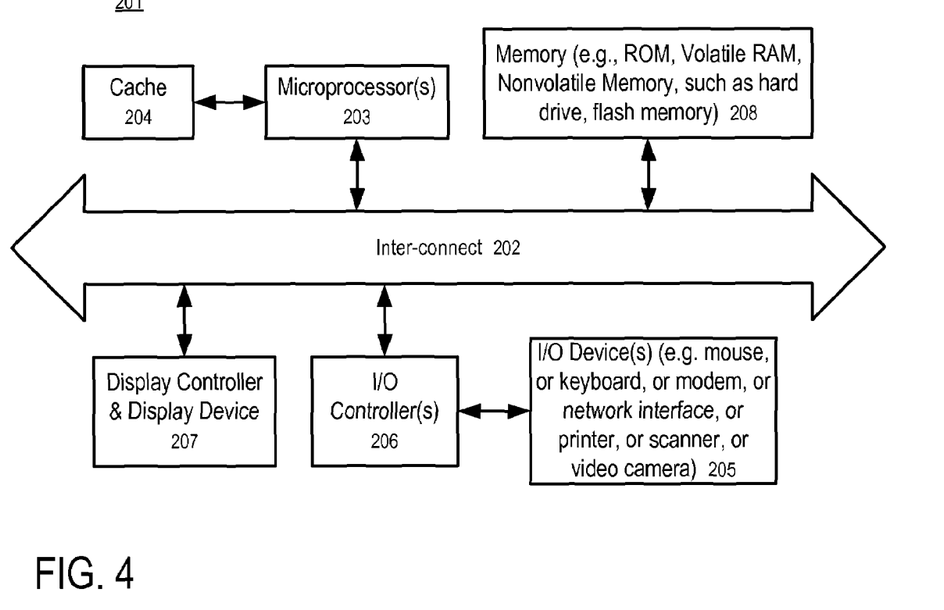
FIG. 4 shows a block diagram of a data processing system, which can be used in various embodiments.

FIG. 4 shows a block diagram of a data processing system 201, which can be used in various embodiments. For example, system 201 may be used as server 101 or data processing system 145 at location 113.

While FIG. 4 illustrates various components of a computer system, it is not intended to represent any particular architecture or manner of interconnecting the components. Other systems that have fewer or more components may also be used.

In FIG. 4, the system 201 includes an inter-connect 202 (e.g., bus and system core logic), which interconnects a microprocessor(s) 203 and memory 208. The microprocessor 203 is coupled to cache memory 204 in the example of FIG. 4.

The inter-connect 202 interconnects the microprocessor(s) 203 and the memory 208 together and also interconnects them to a display controller and display device 207 and to peripheral devices such as input/output (I/O) devices 205 through an input/output controller(s) 206. Typical I/O devices include mice, keyboards, modems, network interfaces, printers, scanners, video cameras and other devices which are well known in the art.

The inter-connect 202 may include one or more buses connected to one another through various bridges, controllers and/or adapters. In one embodiment the I/O controller 206 includes a USB (Universal Serial Bus) adapter for controlling USB peripherals, and/or an IEEE-1394 bus adapter for controlling IEEE-1394 peripherals.

The memory 208 may include ROM (Read Only Memory), and volatile RAM (Random Access Memory) and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, or an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In one embodiment, a data processing system as illustrated in FIG. 4 may be used to implement one or more servers. In another embodiment, a data processing system as illustrated in FIG. 4 is used to implement various components of user phone 141.

In some embodiments, one or more servers of a network or system can be replaced with the service of a peer to peer network of a plurality of data processing systems, or a network of distributed computing systems. The peer to peer network, or a distributed computing system, can be collectively viewed as a server data processing system.

Embodiments of the disclosure can be implemented via the microprocessor(s) 203 and/or the memory 208. For example, the functionalities described can be partially implemented via hardware logic in the microprocessor(s) 203 and partially using the instructions stored in the memory 208. Some embodiments are implemented using the microprocessor(s) 203 without additional instructions stored in the memory 208. Some embodiments are implemented using the instructions stored in the memory 208 for execution by one or more general purpose microprocessor(s) 203. Thus, the disclosure is not limited to a specific configuration of hardware and/or software.

Figure 5:
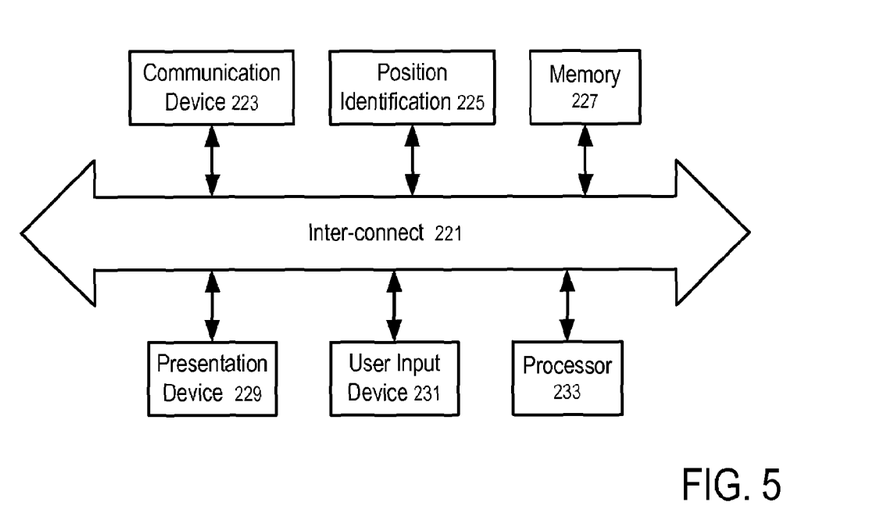
FIG. 5 shows a block diagram of a user device according to one embodiment.

FIG. 5 shows a block diagram of user phone 141 according to one embodiment. In FIG. 5, the user phone 141 includes an inter-connect 221 connecting the presentation device 229, user input device 231, a processor 233, a memory 227, a position identification unit 225 and a communication device 223.

In FIG. 5, the position identification unit 225 is used to identify a geographic location of the user. The position identification unit 225 may include a satellite positioning system receiver, such as a Global Positioning System (GPS) receiver, to automatically identify the current position of the user phone 141. In FIG. 5, the communication device 223 is configured to communicate with server 101.

In one embodiment, the user input device 231 is configured to generate user data content. The user input device 231 may include a text input device, a still image camera, a video camera, and/or a sound recorder, etc.

Method Embodiments

Figure 6:
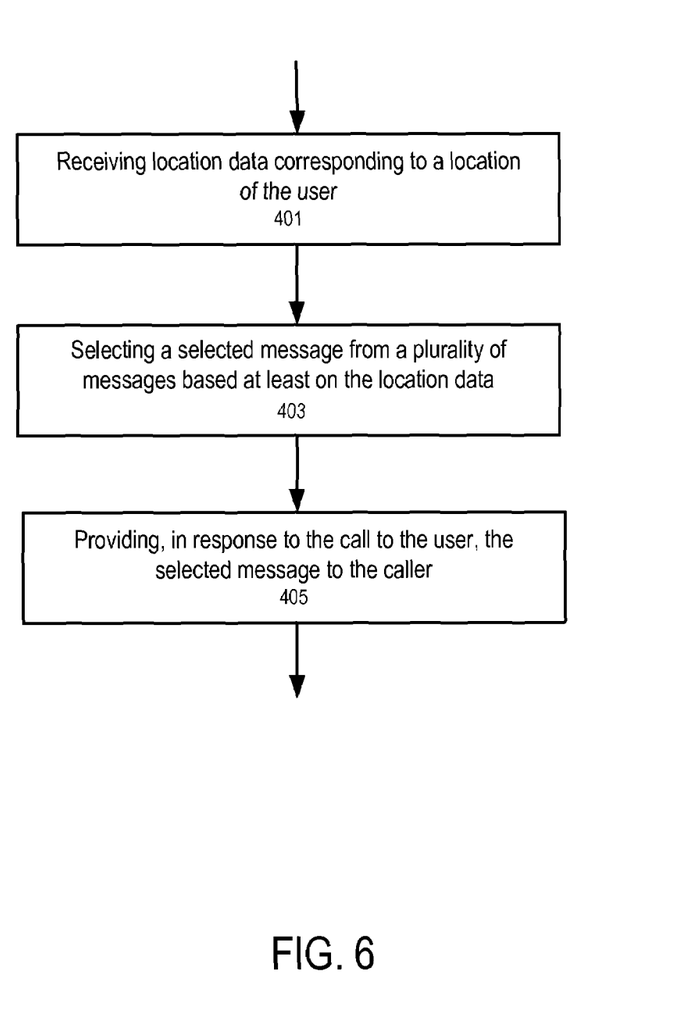
FIG. 6 shows a method to receive location data and select a reply message for a caller to a phone according to one embodiment.

FIG. 6 shows a method to receive location data 133 and select a reply message for caller 107 to user phone 141 according to one embodiment. In FIG. 6, server 101 receives location data 133 corresponding to a location 113 of user 105 (401). Content module 109 selects a selected message for reply to caller 107 based at least on the location data 133 (403). Then, messaging module 111 provides the selected message to caller device 143 in reply to caller 107 (405).

Figure 7:
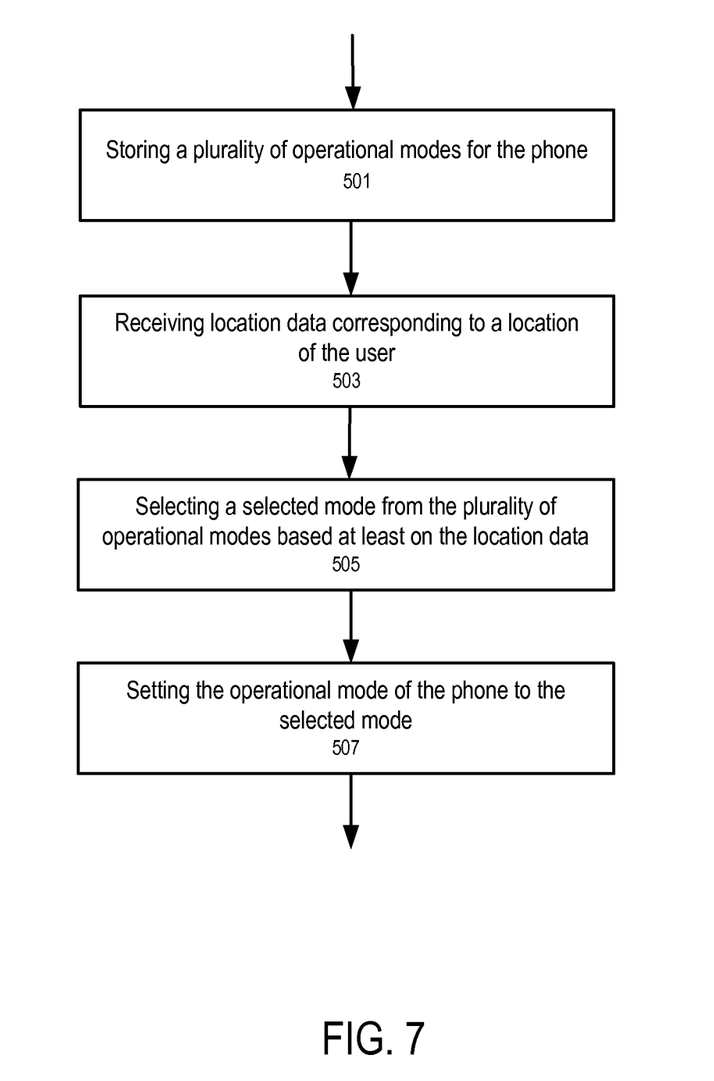
FIG. 7 shows a method to receive location data and configure an operational mode of a phone according to another embodiment.

FIG. 7 shows a method to receive location data 133 and configure an operational mode of user phone 141 according to another embodiment. There may be situations in which user 105 does not desire to provide a customized reply message to a caller 107, but rather user 105 may desire that user phone 141 be configured as to other operating features when at a location 113.

In FIG. 7, server 101 stores several user operational modes 119 for user phone 141 (501). Server 101 receives location data 133 corresponding to a location 113 of user phone 141 (503). Content module 109 selects a selected mode of operation for user phone 141 based at least on the location data 133 (505). Server 101 initiates a command to set the operational mode of user phone 141 to the selected mode (507) (e.g., during a time duration input by user 105 or provided by a system or operator at location 113).

In one embodiment, a message (e.g., SMS message) is sent to user phone 141 when detected at location 113 so that user 105 may affirmatively confirm activation of a customized reply message for that location, or decline participation for that specific location. Also, the sending of location data from user phone 141 or from location 113 may be made conditional on receiving approval from user 105 (e.g., by entering a reply or command on user phone 141).

In addition, user 105 may be provided with an option to specify a time period (e.g., 1 or 2 hours, or longer) in which customized reply messages will be sent (and after which no further messages associated with location 113 are sent). Server 101 or data processing system 145 may handle this query process.

Closing

In the description above, various functions and operations may be described as being performed by or caused by software code to simplify description. However, those skilled in the art will recognize what is meant by such expressions is that the functions result from execution of the code by a processor, such as a microprocessor. Alternatively, or in combination, the functions and operations can be implemented using special purpose circuitry, with or without software instructions, such as using an Application-Specific Integrated Circuit (ASIC) or a Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While some embodiments can be implemented in fully-functioning phone communication networks, computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system, middleware, service delivery platform, SDK (Software Development Kit) component, web services, or other specific application, component, program, object, module or sequence of instructions referred to as "computer programs." Invocation interfaces to these routines can be exposed to a software development community as an API (Application Programming Interface). The computer programs typically comprise one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The instructions may be embodied in digital and analog communication links for electrical, optical, acoustical or other forms of propagated signals, such as carrier waves, infrared signals, digital signals, etc.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A method comprising:
   receiving, via a computing device, location data identifying a physical location of a user phone;
   receiving, from a remote data processing system associated with the physical location of the user phone, a message comprising content relating to the user phone;
   determining, via the computing device, an identity of a caller to the user phone;
   incorporating, via the computing device, customized content into the message, the customized content based on the physical location of the user phone and the identity of the caller; and
   providing, via the computing device, the message comprising the customized content to the caller in response to a call by the caller to the user phone.

2. The method of claim 1, further comprising storing the message in a memory.

3. The method of claim 2, wherein the memory is located on a network associated with the user phone.

4. The method of claim 2, wherein the memory is located at the remote data processing system associated with the physical location of the user phone.

5. The method of claim 1, further comprising:
   specifying a time period, wherein providing the message to the caller comprises providing the message to the caller during the time period.

6. The method of claim 5, further comprising:
   receiving, from the remote data processing system associated with the physical location of the user phone, an update to the message during the time period, wherein providing the message comprises providing the update to the caller during the time period.

7. The method of claim 1, further comprising sending a command to the user phone to set the user phone to a vibrate mode.

8. The method of claim 1, wherein receiving the location data comprises receiving data manually input by the user.

9. The method of claim 1, wherein receiving the location data comprises:
   detecting, using a sensor at the physical location, a physical presence of the user phone; and
   receiving data automatically from the sensor at the physical location.

10. The method of claim 1, further comprising:
    detecting a physical presence of the user phone at the physical location, wherein receiving the location data occurs after detecting the physical presence.

11. The method of claim 10, wherein detecting the physical presence comprises detecting the physical presence using one of:
    a Bluetooth sensor,
    a proximity sensor,
    radio frequency identification, or
    a signature for a wireless network.

12. The method of claim 1, wherein receiving the location data comprises receiving data from a global positioning system sensor in the user phone.

13. The method of claim 1, wherein receiving the location data comprises receiving the location data from the user phone.

14. The method of claim 13, wherein the user phone comprises a sensor to determine the physical location.

15. The method of claim 1, further comprising receiving a privacy setting from the user phone, wherein providing the message is subject to the privacy setting.

16. The method of claim 1, wherein the content comprises a video of the user.

17. The method of claim 16, wherein the content comprises an advertisement sponsored by a merchant associated with the physical location.

18. The method of claim 1, further comprising determining if the caller is on a friends list of the user phone, wherein providing the message comprises selecting the message from a plurality of messages.

19. The method of claim 1, wherein receiving the location data is conditional on receiving approval to send the location data.

20. The method of claim 1, further comprising storing, on a memory, a plurality of phone numbers, each of the plurality of phone numbers associated with a different location, wherein receiving the location data comprises
   determining a phone number from caller identification data of a call by the user phone to one of the plurality of phone numbers, and
   associating the phone number with the one of the plurality of phone numbers.

21. The method of claim 1, further comprising:
   sending another message to the user phone, the another message comprising an inquiry regarding message activation, wherein providing the message is subject to an affirmative response to the inquiry regarding the message activation.

22. A non-transitory computer readable medium comprising instructions that, when executed by a processor, cause the processor to perform operations comprising:
   receiving location data identifying a physical to a location of a user phone;
   receiving, from a remote data processing system associated with the physical location of the user phone, a message comprising content relating to the user phone;
   determining an identity of a caller to the user phone;
   incorporating customized content into the message, the customized content based on the physical location of the user phone and the identity of the caller; and
   providing the message comprising the customized content to the caller in response to a call by the caller to the user phone.

23. A system comprising:
   a processor; and
   a memory storing instructions that, when executed by the processor, cause the processor to perform operations comprising
      receiving location data identifying a physical location of a user phone,
      receiving, from a remote data processing system associated with the physical location of the user phone, a message comprising content relating to the user phone,
      determining an identity of a caller to the user phone,
      incorporating customized content into the message, the customized content based on the physical location of the user phone and the identity of the caller, and
      providing the message comprising the customized content to the caller in response to a call by the caller to the user phone.

* * * * *